(12) United States Patent
Bushinski

(10) Patent No.: US 7,527,118 B2
(45) Date of Patent: May 5, 2009

(54) MOVEABLE ADDITIONAL AXLE ASSEMBLY FOR ATTACHMENT TO SKID STEER LOADER

(76) Inventor: Mark J. Bushinski, W8590 625th St., Ellsworth, WI (US) 54011

( * ) Notice: Subject to any disclaimer, the term of this patent is extended or adjusted under 35 U.S.C. 154(b) by 109 days.

(21) Appl. No.: 10/847,702

(22) Filed: May 17, 2004

(65) Prior Publication Data

US 2006/0042848 A1    Mar. 2, 2006

(51) Int. Cl.
*B62D 61/12*    (2006.01)
(52) U.S. Cl. ............ 180/209; 180/22; 180/24.02; 280/86.5
(58) Field of Classification Search .......... 280/86.5, 280/767, 124.11; 180/24.02, 22, 209
See application file for complete search history.

(56) References Cited

U.S. PATENT DOCUMENTS

| | | | |
|---|---|---|---|
| 1,924,646 A | * 8/1933 | Marcum | ............ 305/143 |
| 3,444,837 A | 5/1969 | Donofrio | |
| 3,572,454 A | 3/1971 | Siren | |
| 3,752,496 A | * 8/1973 | Meinecke, Jr. | ............ 280/81.1 |
| 3,912,293 A | * 10/1975 | Harbers | ............ 280/81.1 |
| 4,009,761 A | 3/1977 | Meyer | |
| 4,063,779 A | * 12/1977 | Martin et al. | ............ 298/22 P |
| 4,392,541 A | * 7/1983 | Barchard | ............ 180/209 |
| 4,892,155 A | * 1/1990 | Wanamaker | ............ 172/199 |
| 6,247,712 B1 | * 6/2001 | Smith et al. | ............ 280/86.5 |
| 6,439,332 B1 | 8/2002 | Meurer | |
| 6,551,050 B1 | 4/2003 | Kallevig et al. | |
| 2003/0108413 A1 | 6/2003 | Pemberton | |

* cited by examiner

*Primary Examiner*—Paul N. Dickson
*Assistant Examiner*—Drew J. Brown

(57) ABSTRACT

A moveable axle assembly that can be moved into an operative position and retracted from an operative position and is constructed and arranged to be pivotally coupled to a motorized device, such as a skid steer loader. The axle assembly has a pair of wheels, an axle stabilizing assembly to securely support and stabilize the axle assembly and hydraulic actuator assemblies to move the moveable axle assembly in to and out of and operative position.

5 Claims, 5 Drawing Sheets

MOVEABLE ADDITIONAL AXLE ASSEMBLY FOR ATTACHMENT TO SKID STEER LOADER

FIELD OF THE INVENTION

This invention relates generally to the field of stabilizing and providing traction control and stability to a four wheeled vehicle, more specifically, to a movable additional axle assembly attached to a skid steer loader.

BACKGROUND OF THE INVENTION

A wide variety of versatile motorized devices are used in a wide variety of industries, such as the construction, maintenance, farming and landscaping industries. Such devices include skid steer loaders, light tractors, "four-wheeler" all terrain vehicles and other compact power units. Skid steer loaders, in particular, are known to be useful and versatile in the handling of a variety of materials, including earth moving and material transportation tasks. One-line of skid steer loaders is sold under the trademark Hydra-Mac™, manufactured by Hydra-Mac International Inc., of Thief River Falls, Minn. Another line of skid steer loaders is sold under the trademark Gehl™, by the Gehl Company, West Bend, Wis.

Skid steer loaders are particularly useful due to their compact size and maneuverability. However, one problem associated with using such loaders, is that they have a tendency to be somewhat unstable when loaded or when going up or down inclines, especially as the angle of the incline increases. For example, particularly for higher weight loads, the loader tends to tip forward upon lifting such a load, especially if the loader is facing down an incline. Should the loader be facing up an incline, the higher a heavy weight load is lifted, the loader experiences a tendency to tip backwards. This tipping tendency further reduces the efficient use of such loaders as an operator is limited in the amount of weight that can be lifted and safely transported, thus requiring longer time periods to accomplish the same work product. Further, there are incline angles that current skid steer loaders are simply incapable of traversing.

Other use problems experienced with such loaders includes a bouncing action that reduces operator comfort and operational efficiency, effects particularly experienced when driving over an uneven surface, especially when carrying a load, and insufficient traction when using an attachment on the loader such as a bucket or a blade to dig or push material.

Various means have been employed to overcome these problems. Counterweights may be used at the opposite end of the power unit from the load lifting attachment to balance the loader. Though this may help with reducing the tendency of a loader to tip forward, it only increases the tendency to tip backward. Load stabilizers have been used which are incorporated to the front end of a skid steer loader in the area of an attachment to the loader, examples of which are disclosed in U.S. Pat. No. 6,551,050 and published U.S. Patent application No. 2003/0108413. However, such load stabilizers impede the effective use of the skid steer loader to dig or push materials, where such actions involve or create different surface grade levels or when attempting to use a skid steer loader to product a level grade from an undulating grade. Caster assemblies have been used which are incorporated to the rear end of a skid steer loader, an example of which is disclosed in U.S. Pat. No. 6,439,332. Though engagement of the caster assembly may provide some bounce control when carrying an object at the front of a skid steer loader, engagement of the caster assembly reduces the transfer of power to ground engagement by lifting two of the driven wheels off of the ground surface.

Thus improvements to the versatile skid steer loader that enable more efficient work output through greater transfer of power to ground engagement, that enable safe and efficient transit of steeper inclines and that provides for greater operator safety through more comfortable ground transit operation and greater stability on inclines, is needed.

SUMMARY OF THE INVENTION

The present invention increases the safe, stable use of skid steer loaders in the lifting and transporting of loads over surfaces of various inclines and evenness and in increasing the efficient use of such loaders in the lifting and transporting of loads over surfaces of various inclines and evenness and increases the efficiency and the effectiveness of such loaders in the digging and/or pushing of a variety of materials.

The present invention is a moveable axle assembly that can be moved in a generally vertical direction and is constructed and arranged such as to be pivotally coupled to a motorized device. In one embodiment, when attached to a skid steer loader, the moveable axle assembly is pivotally coupled to the rear of the skid steer loader. The moveable axle assembly comprises an axle assembly having a pair of wheels, preferably two actuator assemblies connected to the hydraulic system of the skid steer loader which enable movement of the moveable axle assembly with respect to the skid steer loader from an inoperative position where the wheels of the moveable axle assembly do not engage the surface upon which the original wheels of the skid steer loader are in contact with, to an operative position wherein the wheels of the moveable axle assembly are in contact with the surface that the original wheels of the skid steer loader are in contact with. In one such operative position, the surface contact area of the tires of the moveable axle assembly are in the same horizontal plane as the surface contact area of the tires of the skid steer loader. The moveable axle assembly can further be lowered to an operative position where the wheels of the moveable axle assembly and the front wheels of the skid steer loader engage the surface, but the rear wheels of the skid steer loader do not.

In a preferred embodiment, the wheels of the moveable axle assembly are in the same vertical plane defined by the original wheels of the skid steer loader and the wheels of the moveable axle assembly are of approximately the same dimension as the original wheels of the skid steer loader to which the moveable axle assembly is coupled.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The movable axle assembly of this invention is arranged and coupled to the rear of a skid steer loader in such manner that the moveable axle assembly can be moved in a generally vertical direction, from and to an unengaged position, a fully engaged position, and various positions between fully engaged and disengaged. The coupling of the moveable axle assembly of this invention to a skid steer loader provides greater stability to skid steer loader operation in the lifting and transporting of loads over surfaces of various inclines and evenness, increases the safe operation of skid steer loaders, and also increases the efficient use of such loaders in the lifting and transporting of loads over surfaces of various inclines and evenness, as well as increases the efficiency and the effectiveness of such loaders in the digging and/or pushing of a variety of materials.

Figure 1:
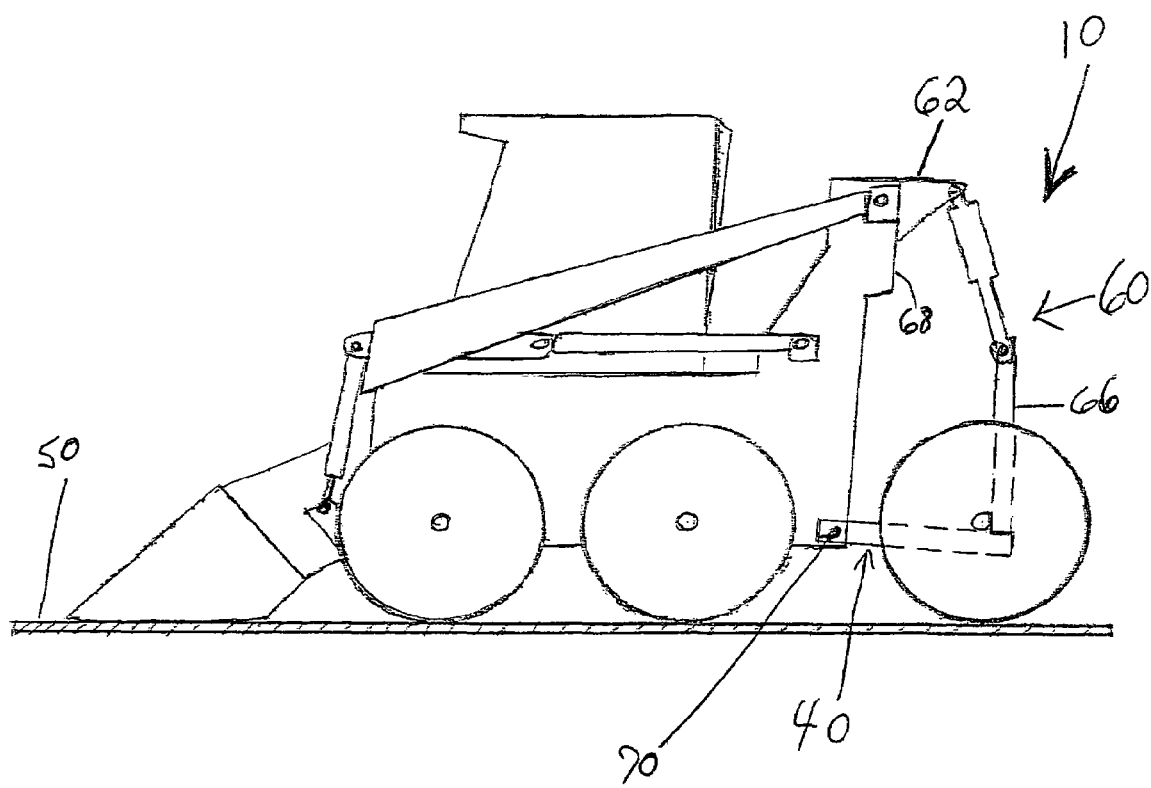
FIG. 1 is a perspective view illustrating one exemplary embodiment of a moveable axle assembly coupled to a skid steer loader.
Figure 2:
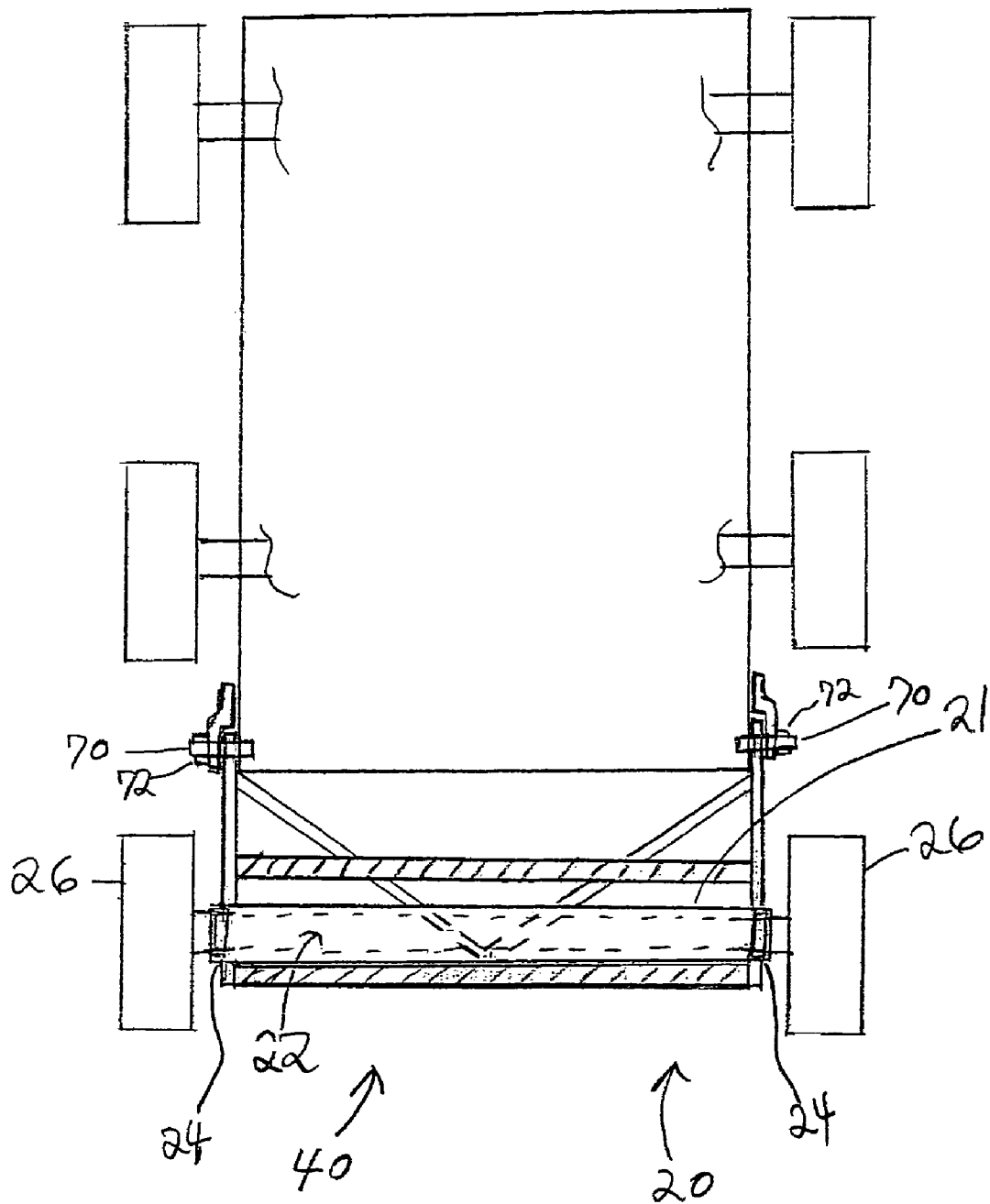
FIG. 2 is a top view illustrating the axle assembly and the axle stabilizing assembly of the moveable axle assembly coupled to a skid steer loader.
Figure 3:
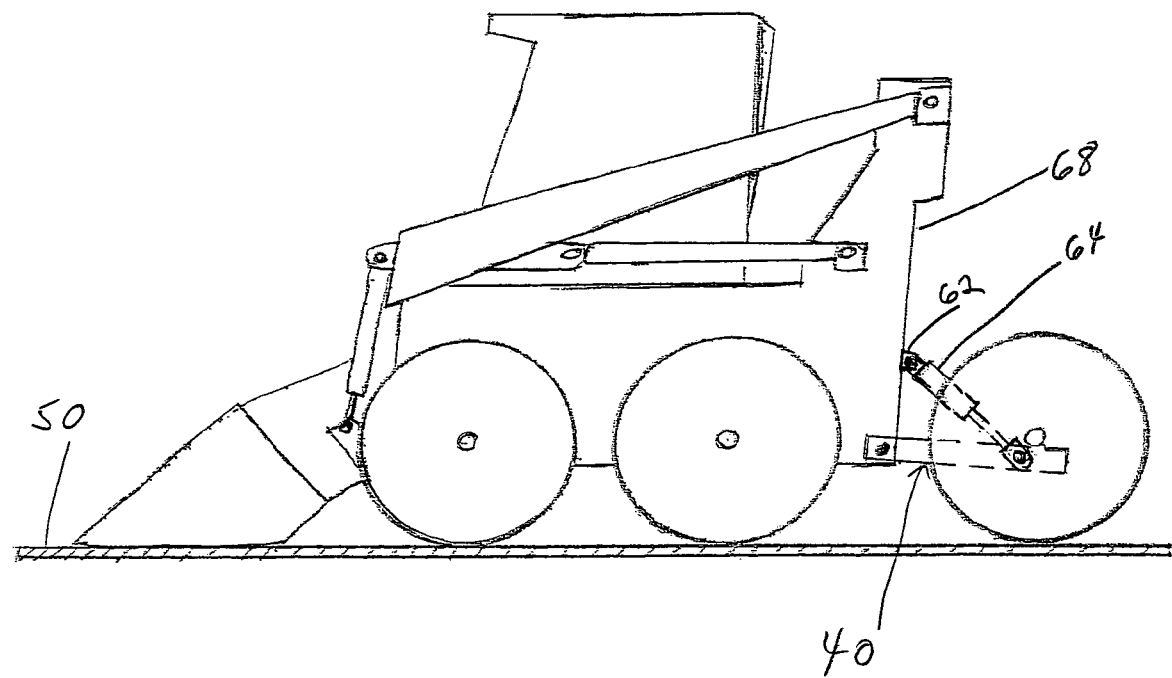
FIG. 3 is a side view illustrating an alternate embodiment of the attaching points of the lift actuator assembly of a moveable axle assembly coupled to a skid steer loader.

Referring to FIGS. 1 through 5, a skid steer loader, to which the movable axle assembly of this invention is coupled, has a pair of non-pivoting front wheels and a pair of non-pivoting rear wheels. Referring to FIGS. 1, 2 and 3, the moveable axle assembly 10 of one embodiment of this invention is comprised of three major components: an axle assembly 20, an axle stabilizing assembly 40 and a lift actuator assembly 60. The axle assembly 20 is comprised of an axle tube 21 containing an axle shaft 22 or stub shafts, bearings 24 to support the axle shaft 22 or stub shafts and non-pivoting wheels 26 connected to each outboard end of the axle shafts 22 or stub shafts. The axle stabilizing assembly 40 is constructed of structural members that may be comprised of iron or alloys thereof, such as steel, to enable the axle stabilizing assembly 40 to be pivotally attached to the skid steer loader, to securely support and position the axle assembly 20, and to which the lift actuator assembly 60 can be attached. The lift actuator assembly 60 is comprised of hydraulic lift cylinder attaching mount 62 at the rear of the skid steer loader, at least one hydraulic lift cylinder 64 and hydraulic lift cylinder attaching mount 66 at the axle stabilizing assembly 40. The hydraulic lift cylinder attaching mounts 62 attached at the rear of the skid steer loader can be positioned from a position at the top of the rear structural support 68 of the skid steer loader (FIG. 1) downwards along the rear structural support 68 to a lower position (FIG. 3) so long as the lower mounting position of mount 62 is above the vertical height of the connection point of the hydraulic lift cylinder 64 to the axle stabilizing assembly 40 when the moveable axle assembly 10 is in the fully non-engaged position.

In a preferred embodiment of the subject invention, two hydraulic lift cylinders 64 are used to raise and lower and hold the moveable axle assembly in an operator selected vertical position of the moveable axle assembly 10. Such embodiment employs two hydraulic lift cylinder attaching mounts 62 to the rear structural support 68 of the skid steer loader and two hydraulic lift cylinder attaching mounts 66 at the axle stabilizing assembly 40. In this embodiment, the hydraulic lift cylinders 64 and attaching mounts 62 are preferably affixed laterally as far left and right to the rear structural support as feasible based upon the configuration of the rear structural support of the skid steer loader to which the moveable axle assembly 10 is coupled. The hydraulic lift cylinder mounts 66 at the axle stabilizing assembly 40 will then be located at lateral points along the axle stabilizing assembly 40 to line up with mounts 62.

Skid steer loaders are equipped with hydraulic systems to drive the wheels of the loader. A separate hydraulic system with its own pump operates the cylinders of the boom assembly to which various attachments such as buckets and blades are affixed.

In skid steer loader drive arrangements, separate variable displacement drive pumps drive the wheels on each side of the loader. That is, a variable displacement drive pump drives a wheel, either a front wheel or a rear wheel, or both wheels, on a first side of the skid steer loader and a separate variable displacement drive pump drives the wheels on the second side of a skid steer loader following the same drive configuration followed on the first side, i.e., driving either a front wheel or a rear wheel or both wheels. In this manner, either all wheels on the loader are driven, or the wheels are driven in matched pairs, i.e. the front wheels are driven or the rear wheels are driven. In some arrangements, the variable displacement drive pumps are each connected such that a pump directly drives one wheel on a side and a chain coupled to the drive hub of the driven wheel drives the other wheel on a side. Other wheel drive arrangements are known to those skilled in the art.

In the preferred embodiment of the invention, the hydraulic lift cylinders 64 are connected hydraulically to the hydraulic system of a skid steer loader that operates the boom cylinders. A separate hydraulic control valve to which the hydraulic lift cylinders 64 are connected is fitted to the skid steer loader hydraulic system. The hydraulic control valve is located in the operator's compartment of the skid-steel loader. Movement of the control valve in one direction causes hydraulic fluid to flow in the direction that causes the lift cylinder ram to extend, thus lowering the moveable axle assembly 10, ultimately into the full operating position. Movement of the control valve in the opposite direction causes hydraulic fluid to flow in the direction that causes the lift cylinder ram to contract into the ram, thus raising the moveable axle assembly 10, ultimately into the full unengaged position.

Figure 4:
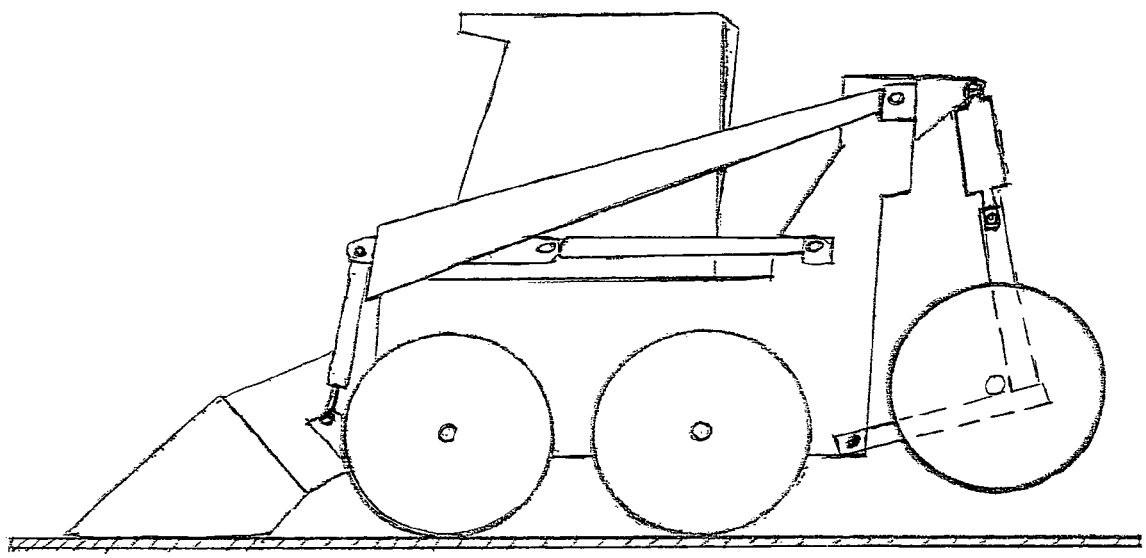
FIG. 4 is a side view illustrating a moveable axle assembly coupled to a skid steer loader with the moveable axle assembly in the non-engaged position.
Figure 5:
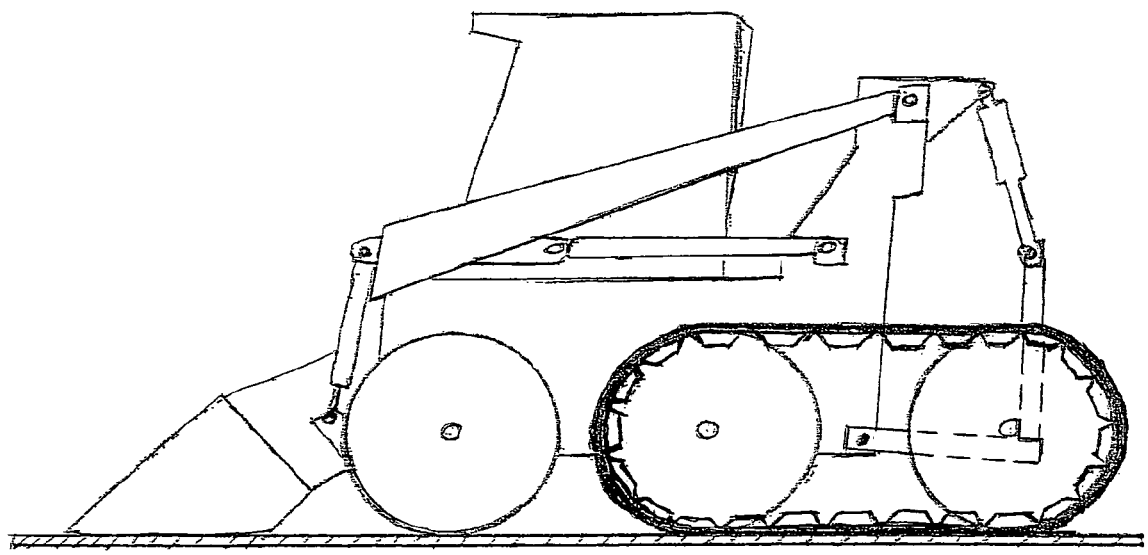
FIG. 5 is a side view of a skid steer loader fitted with tracks, where the tracks are placed over the center wheel of the skid steer loader and over the wheel of a moveable axle assembly coupled to the skid steer loader.

FIG. 1 is a perspective view illustrating one exemplary embodiment of a moveable axle assembly 10 in accordance with the present invention coupled to the rear of a skid steer loader. FIG. 3 is a side view illustrating an alternate embodiment of the attaching points of the lift actuator assembly 60 of a moveable axle assembly 10 coupled to a skid steer loader. In particular, the hydraulic lift cylinder mounts 62 are lower. Both FIGS. 1 and 3 depict the moveable axle assembly as coupled to a skid steer loader in the engaged position. FIG. 4 is a side view illustrating the moveable axle assembly coupled to a skid steer loader with the moveable axle assembly in the non-engaged position.

As shown in FIGS. 1 and 3, the moveable axle assembly 10 is in the engaged position, that is, the axle assembly 20 is in a position in which the wheels of the moveable axle assembly 10 are engaged with the surface 50 that the remaining wheels of the skid steer loader is in contact with. The surface contact plane of the wheels of the moveable axle assembly 10, when the moveable axle assembly 10 is in the engaged position, is approximately the same surface contact plane as the remaining wheels of the skid steer loader.

In FIG. 1, the lift actuator assembly cylinder upper mounts 62 are shown attached near the top of the rear structural support 68 of the skid steer loader. In FIG. 3, the lift actuator assembly cylinder upper mounts 62 are shown attached at a location along the rear structural support 68 of the skid-loader at a vertical height that is slightly above the vertical height of the hydraulic lift cylinder attaching point to the hydraulic lift cylinder attaching mount 66 at the axle stabilizing assembly when the moveable axle assembly 10 is in the full-up disengaged position. The disengaged position may be almost any vertical distance of the axle assembly 20 such that the contact plane of the wheels of the moveable axle assembly 10 are no longer in contact with the surface 50 upon which the skid steer loader is being operated. It is preferable, in order to obtain a disengaged position over most surfaces upon which a skid steer loader may be operated, that the vertical lift distance of the moveable axle assembly 10 is at least ten inches.

Though the preferred embodiment employs two hydraulic lift cylinders 64 for the lift actuator assembly 60, a single hydraulic lift cylinder centrally mounted could be used. The use of a single hydraulic lift cylinder would require modification of the axle stabilizing assembly 60 and probably the addition of a support brace horizontally across the rear structural support 68 at the height selected for attachment of the hydraulic lift cylinder upper mount 62 to enable central mounting of the hydraulic lift cylinder to the axle stabilizing assembly 40 and to the rear structural support 68 of the skid steer loader. Such modification are within the skill of those within the art.

It is generally preferred that the wheels of the moveable axle assembly 10 be generally comparable in size to the wheels of the skid steer loader to which the moveable axle assembly 10 of this invention is attached. However, wheels of any size can be fitted to the moveable axle assembly 10 so long as the moveable axle assembly 10 can be mounted to the skid steer loader in such manner that the wheels can be moved into an engaged position and into a disengaged position.

In one embodiment of this invention, the moveable axle assembly 10 can be equipped with lift actuator assembly hydraulic cylinders 64 and mounted such that the wheels 26 of the moveable axle assembly 10 can be lowered to an engaged position such that the surface contact plane of the wheels of the moveable axle assembly 10 are lower than the surface contact plane of the center wheels of a skid steer loader equipped with the moveable axle assembly 10 of this invention. With the contact plane of the moveable axle assembly 10 wheels 26 lower than the contact surface of the center wheels of the skid steer loader, the wheel base of the skid steer loader is effectively lengthened, which results in the skid steer loader being less impacted by surface undulations as the skid steer loader traverses an undulating surface.

Though the embodiments discussed herein and depicted by the Figures show the hydraulic lift cylinders 64 mounted in such manner that extension of the ram of the cylinder moves the moveable axle assembly into an engaged position and contraction of the ram of the cylinder moves the moveable axle assembly into the unengaged position, the cylinders could be mounted below the axle stabilizing assembly 40 pivot attaching point to the skid steer loader such that extension of the cylinder ram would move the moveable axle assembly 10 into the unengaged position and contraction of the ram into the cylinder would move the moveable axle assembly 10 into the engaged position. It would be understood by those skilled in the art that in this configuration, the axle stabilizing assembly 40 pivotable attaching point, stub shaft 70 in one embodiment, would be required to be located higher on the side of the skid steer loader.

In one embodiment of this invention, the attaching structure for pivotal mounting of the moveable axle assembly 10 to the rear of a skid steer loader is a stub shaft 70 at each outer lower corner of a skid steer loader as shown in FIG. 2. The stub shaft 70 is threaded at the outer end thereof to enable a nut 72 to be threaded onto the shaft 70 to secure position of the axle stabilizing assembly 40 onto the stub shaft 70 at the rear of the skid steer loader. How tightly the nut 72 is applied controls both the pivoting ease of the axle stabilizing assembly 40 upon the stub shaft 70 and the sideways motion of the axel stabilizing assembly 40. Appropriate tightness of the nut 72 will be apparent to those skilled in the art. The nut 72 can be of the locking variety or can be secured in a specific tightness position by methods known to those skilled in the art.

An optional support brace 74 for the stub shaft 70 is shown in FIG. 2. The optional stub shaft 70 support brace 74 not only provides support to the stub shaft 70 but also provides additional stability to the position and motion of the moveable axle assembly 10.

It has been found that the tires of a skid steer loader to which a moveable axle assembly 10 of this invention has been mounted, can be operated at a significantly lower tire pressure. A skid steer loader to which the moveable axle assembly 10 was attached was operated with tire pressures as low as one half of the skid steer loader manufacture's recommended tire pressure. Stability of the thusly operated skid steer loader was found to be greater than the stability of the skid steer loader operated at recommended tire pressures and without the moveable axle assembly 10 attached. It was further noted that the bounce otherwise experienced when operating over some surfaces was virtually non-existent, and thus provided less jar to the operator. Further, it is believed that operating at reduced tires pressures will result in less stress on the mechanical components of the skid steer loader.

A common accessory for skid steer loaders are track belts that are mounted over the wheels of a skid steer loader to provide additional traction. The track belts, constructed of, for example, steel or polyurethane, are mounted one on each side in a loop over the two wheels on each side of the skid steer loader. It has been found that mounting the track belts over the wheels of the moveable axle assembly and the center wheel of skid steer loaders to which a moveable axle assembly has been mounted provides greater traction than the traction experienced by an identical skid steer loader without the moveable axle assembly and the track belts looped over the standard wheels of a skid steer loader.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

It is claimed:

1. A moveable axle assembly for attachment to the rear of a skid steer loader, the skid steer loader having a pair of non-pivoting front wheels and a pair of non-pivoting rear wheels, the moveable axle assembly increasing the wheel base of the skid steer loader and providing straight line operating stability, the moveable axle assembly comprising:

an axle assembly having a pair of non-pivoting wheels in the same vertical plane defined by the front and rear wheels of the skid steer loader;

a lift actuator assembly having two hydraulic lift cylinders, constructed and arranged to be connected to a hydraulic system of the skid steer loader to cause movement of the axle assembly with respect to the skid steer loader from an non-engaged position, wherein the front and rear wheels of the skid steer loader are in a ground engaging position with the axle assembly in a position where the wheels of the axle assembly do not engage the ground, to an engaged position, wherein at least the front wheels of the skid steer loader and the wheels of the axle assembly engage the ground;

the wheels of the axle assembly being of a dimension generally equivalent to the dimension of the front and rear wheels, and wherein when the wheels of the axle assembly are in the engaged position, the effective wheel base of the skid steer loader is longer, with the three wheels on each side of the skid steer loader fixed in the same plane of operation.

2. The moveable axle assembly of claim 1, further comprising an axle stabilizing assembly, the axle assembly connected to the axle stabilizing assembly, the axle stabilizing assembly constructed and arranged to be pivotally coupled to the skid steer loader.

3. The moveable axle assembly of claim 2, wherein the lift actuator assembly of claim 1 is constructed and arranged to be coupled to the skid steer loader at one end thereof and is coupled to the axle stabilizing assembly at another end thereof.

4. A skid steer loader assembly comprising:
a body;
a pair of non-pivoting front wheels mounted with respect to a front portion of the body;
a pair of non-pivoting rear wheels mounted with respect to a rear portion of the body;
a hydraulic system for driving at least one pair of wheels and a second hydraulic system;
an axle assembly and an axle stabilizing assembly, the axle assembly having a pair of non-pivoting wheels in the same vertical plane defined by the front and rear wheels, the axle assembly pivotally coupled to the rear of the body; and
a lift actuator assembly with two hydraulic lift cylinders connected to the second hydraulic system, the lift actuator assembly constructed and arranged to be connected to the axle assembly to cause movement of the axle assembly with respect to the skid steer loader from an non-engaged position, wherein the front and rear wheels of the skid steer loader are in a ground engaging position with the axle assembly in a position so as the wheels of the axle assembly do not engage the ground, to an engaged position, wherein at least the front wheels of the skid steer loader and the wheels of the axle assembly engage the ground all in the same vertical plane, and;

wherein when the wheels of the axle assembly are in the engaged position, the effective wheel base of the skid steer loader is longer, with the three wheels on each side of the skid steer loader fixed in the same plane of operation.

5. A skid steer loader assembly comprising:
a body;
a pair of non-pivoting front wheels mounted with respect to a front portion of the body;
a pair of non-pivoting rear wheels mounted with respect to a rear portion of the body;
a hydraulic system for driving at least one pair of wheels and a second hydraulic system;
an axle assembly having a pair of non-pivoting wheels in the same vertical plane defined by the front and rear wheels, the axle assembly pivotally coupled to the rear of the body;
a lift actuator assembly having two hydraulic lift cylinders connected to the second hydraulic system, wherein the lift actuator assembly is constructed and arranged to be connected to the axle assembly to cause movement of the axle assembly with respect to the skid steer loader from an non-engaged position, wherein the front and rear wheels of the skid steer loader are in a ground engaging position with the axle assembly in a position so as the wheels of the axle assembly do not engage the ground, to an engaged position, wherein at least the front wheels of the skid steer loader and the wheels of the axle assembly engage the ground all in the same vertical plane;
and a separate track belt on each side of the body that is mounted around the rear wheels of the skid steer loader and the wheels of the axle assembly, and
wherein when the wheels of the axle assembly are in the engaged position, the effective wheel base of the skid steer loader is longer, with the three wheels on each side of the skid steer loader fixed in the same plane of operation.

* * * * *